(12) United States Patent
Park et al.

(10) Patent No.: US 8,576,477 B2
(45) Date of Patent: Nov. 5, 2013

(54) ORGANIC LIGHT-EMITTING DISPLAY DEVICE

(75) Inventors: Hye-Jung Park, Yongin (KR); Soon-Ryong Park, Yongin (KR); Woo-Suk Jung, Yongin (KR); Sun-Hwa Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 129 days.

(21) Appl. No.: 13/296,902

(22) Filed: Nov. 15, 2011

(65) Prior Publication Data
US 2012/0147452 A1    Jun. 14, 2012

(30) Foreign Application Priority Data

Dec. 14, 2010  (KH) .................... 10-2010-0127860

(51) Int. Cl.
*G02B 26/00* (2006.01)
*G02B 26/02* (2006.01)
*G09G 3/34* (2006.01)

(52) U.S. Cl.
USPC ........................ 359/296; 359/228; 345/107

(58) Field of Classification Search
CPC .............. G02F 1/167; G02F 1/134363; G02F 1/13473; G02F 2001/1678; G02F 2203/34
USPC ................... 313/117; 345/107; 359/228, 296
See application file for complete search history.

(56) References Cited

U.S. PATENT DOCUMENTS

| | | | |
|---|---|---|---|
| 6,680,726 B2 * | 1/2004 | Gordon et al. | 345/107 |
| 2007/0069995 A1 * | 3/2007 | Shin et al. | 345/76 |
| 2007/0273956 A1 | 11/2007 | Kim et al. | |
| 2010/0060628 A1 * | 3/2010 | Lenssen et al. | 345/214 |

FOREIGN PATENT DOCUMENTS

| | | |
|---|---|---|
| JP | 2003-195362 A | 7/2003 |
| KR | 10-2006-0019304 A | 3/2006 |
| KR | 10-2007-0112943 A | 11/2007 |
| KR | 10-2008-0067068 A | 7/2008 |

\* cited by examiner

*Primary Examiner* — David N Spector
(74) *Attorney, Agent, or Firm* — Knobbe, Martens, Olson & Bear LLP

(57) ABSTRACT

An organic light-emitting display device is disclosed. In one embodiment, the device includes a display unit having a plurality of pixels and an electronic ink layer for changing a distribution of charged ink particles and selectively substantially covering the pixels on the display unit. The device provides black visibility while it is powered off using an electronic ink layer operating in the same manner as a shutter so that a reduction of brightness while forming an image may be inhibited.

11 Claims, 2 Drawing Sheets

ORGANIC LIGHT-EMITTING DISPLAY DEVICE

CROSS-REFERENCE TO RELATED PATENT APPLICATION

This application claims the benefit of Korean Patent Application No. 10-2010-0127860, filed on Dec. 14, 2010, in the Korean Intellectual Property Office, the disclosure of which is incorporated herein in its entirety by reference.

BACKGROUND

1. Field

The described technology generally relates to an organic light-emitting display device, and more particularly, to an organic light-emitting display device having a screen having excellent black visibility while the display device is powered off.

2. Description of the Related Technology

Recently, display devices have been replaced with portable thin flat panel displays. In particular, organic light-emitting displays are self-emissive, and have wide viewing angles, excellent contrast, and quick response speeds, and thus have come into the spotlight as next generation displays.

An organic light-emitting display includes a thin film transistor and an organic light-emitting device driven by the thin film transistor to emit light. The organic light-emitting device has a basic structure in which a positive electrode layer, an emission layer, and a negative electrode layer are sequentially stacked. Accordingly, when a voltage is applied between the positive electrode layer and the negative electrode layer of the organic light-emitting device by the thin film transistor, light is emitted from the emission layer to form an image.

SUMMARY

One inventive aspect is an organic light-emitting display device inhibiting a reduction of brightness and providing black visibility to a screen.

Another aspect is an organic light-emitting display device including a display unit comprising a plurality of pixels; and an electronic ink layer for changing a distribution of charged ink particles and selectively covering the pixels on the display unit.

The charged ink particles of the electronic ink layer may be distributed to cover the pixels while the display unit is turned off and not to cover the pixels while the display unit is turned on.

A transparent window may be disposed on the display unit, and the electronic ink layer may be disposed between the display unit and the transparent window.

A protective film may be further interposed between the display unit and the electronic ink layer and between the electronic ink layer and the transparent window.

The electronic ink layer may include a main electrode to apply an electrical force to the charged ink particles, and the charged ink particles may gather around the main electrode by applying a voltage to the main electrode while the display unit is turned on.

The electronic ink layer may include a main electrode and an auxiliary electrode to apply an electrical force to the charged ink particles in different directions, the charged ink particles may gather around the main electrode when a voltage is applied to the main electrode when the display unit is turned on, and the charged ink particles may gather around the auxiliary electrode when a momentary voltage is applied to the auxiliary electrode when the display unit is turned off.

The electronic ink layer may include a plurality of capsules, and the charged ink particles may be disposed in the capsules.

The charged ink particles may move in a first direction toward the main electrode within the capsules when the display unit is turned on to uncover the pixels and move in a second direction toward the auxiliary electrode within the capsules when the display unit is turned off to cover the pixels.

The charged ink particles may be distributed in gaps between the pixels when moving in the first direction.

A size of one capsule may be greater than a size of one pixel.

BRIEF DESCRIPTION OF THE DRAWINGS

FIG. 2. shows the organic light-emitting display device of FIG. 1 powered on.

FIG. 4 shows the organic light-emitting display device of FIG. 3 powered on.

DETAILED DESCRIPTION

Generally, a screen of an organic light-emitting display is desirable to be viewed as a black screen while the display is powered off. In other words, if a complicated pixel structure of the organic light-emitting device is viewed through the screen while the device is powered off, its appearance may not be attractive to customers.

For this, a polarization plate has generally been installed in the screen to block reflection of ambient light incident onto the screen. That is, if incident light is reflected by the pixel structure, it will be visible to a viewer. However, if the reflected light is blocked by the polarization plate, the screen will be viewed as a black screen, during times of power off.

However, the polarization plate can also block light from the emission layer which turns on image during power on. In other words, the polarization plate not only blocks the reflected external light but also interrupts transmittance of light emitted from the emission layer, and thus the brightness of the organic light-emitting display will often be reduced by as much as about 42% to about 44%, and accordingly power consumption will need to increase in order to compensate for the reduction in brightness. Since the increased power requirement lowers competitiveness of a commercial product, there is a need to inhibit the reduction of the brightness.

Hereinafter, embodiments will now be described more fully with reference to the accompanying drawings.

Figure 1:
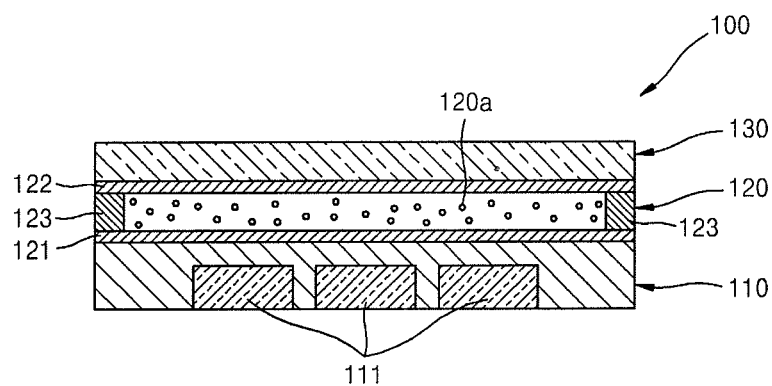
FIG. 1 shows an organic light-emitting display device which is powered off according to an embodiment.
Figure 2:
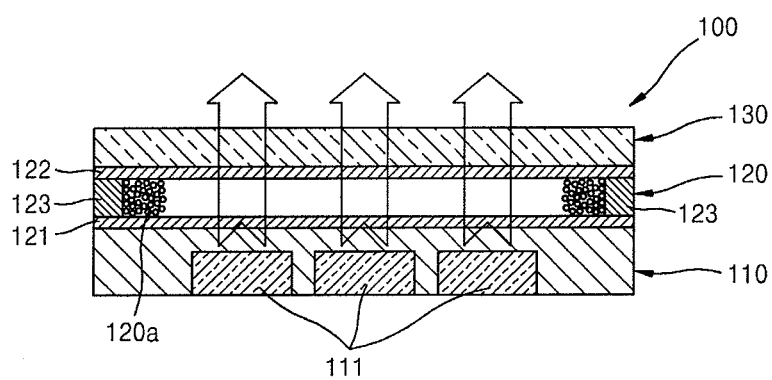

FIGS. 1 and 2 show schematic structures of an organic light-emitting display device 100 according to an embodiment. A display unit 110 is powered off in FIG. 1, and the display unit 110 is powered on in FIG. 2.

First, referring to FIG. 1, the organic light-emitting display device 100 includes the display unit 110 including a plurality of pixels 111, a transparent window 130 formed on the display unit 110, and an electronic ink layer 120 interposed between the display unit 110 and the transparent window 130.

Reference numerals 121 and 122 indicate protective films substantially covering upper and lower surfaces of the electronic ink layer 120.

In one embodiment, the electronic ink layer 120, similar to a polarization plate, provides black visibility to a screen and includes a plurality of charged ink particles 120a and a main electrode 123 for electrically attracting the ink particles 120a. Here, the black visibility means that a display screen is viewed as a black screen while the display is powered off. A mechanism of the electronic ink layer 120 will be described in detail later.

In addition, each of the pixels 111 of the display unit 110 is a unit pixel including a self-emitting organic light-emitting device (not shown) for forming an image. An image is formed when light generated in an emission layer of each organic light-emitting device is emitted via the transparent window 130.

Accordingly, when an image is formed, light generated in each pixel 111 passes through the electronic ink layer 120 and the transparent window 130. In this regard, upper portions of the pixels 111 facing the transparent window 130 may or may not be covered according to a distribution of the ink particles 120a of the electronic ink layer 120.

In one embodiment, while the display unit 110 is powered on, i.e., while an image is formed, the ink particles 120a of the electronic ink layer 120 does not cover the upper portions of the pixels 111. In one embodiment, while the display unit 110 is powered off, i.e., while an image is not formed, the ink particles 120a covers the upper portions of the pixels 111 to provide black visibility to the screen.

An operation of the electronic ink layer 120 will be described.

First, the ink particles 120a are black particles capable of providing black visibility. Although the ink particles 120a may have another color, black particles are effective for substantially covering the pixels 111 in order to prevent a complicated pixel structure from being visible through the screen.

In addition, the ink particles 120a are charged with positive charges or negative charges. Accordingly, the ink particles 120a may move by an electrical force.

In addition, the main electrode 123 is connected to a power source of the display unit 110 and powered on/off with the display unit 110. In other words, a voltage is applied to the main electrode 123 when the display unit 110 is powered on, and the voltage is not applied to the main electrode 123 when the display unit 110 is powered off.

In such a structure, since a voltage is not applied to the main electrode 123 while the display unit 110 is powered off as shown in FIG. 1, an electric force is not applied to the charged ink particles 120a of the electronic ink layer 120.

Accordingly, the ink particles 120a are substantially uniformly distributed in the electronic ink layer 120, and thus the black ink particles 120a substantially cover the pixels 111. Thus, the pixels 111 are not visible due to the ink particles 120a, and black visibility is provided to the screen. In other words, the electronic ink layer 120 functions as a polarization plate to provide black visibility to the screen while the display unit 110 is powered off.

Then, when the display unit 110 is powered on, a voltage is applied to the main electrode 123 as shown in FIG. 2, and due to the voltage applied to the main electrode 123, the charged ink particles 120a of the electronic ink layer 120 gather (or collect) around the main electrode 123 by being electrically attracted thereto. The charged ink particles 120a that are positively charged move toward a negative electrode of the main electrode 123, and the charged ink particles 120a that are negatively charged move toward a positive electrode of the main electrode 123.

The ink particles 120a may be either positively charged or negatively charged. In one embodiment, the ink particles 120a move toward only the positive electrode or the negative electrode of the main electrode 123 and thus spatial applicability is reduced. Thus, the ink particles 120a charged with half positive charges and half negative charges may be used to increase efficiency.

If the ink particles 120a gather around the main electrode 123, the upper portions of the pixels 111 of the display unit 110 are uncovered. In one embodiment, after the ink particles 120a move toward the main electrode 123, a light-emitting pathway of the pixels 111 for forming an image is uncovered.

Here, if the organic light-emitting device (not shown) of each pixel 111 emits light, the light passes through the electronic ink layer 120 and the transparent window 130 to form an image.

Accordingly, while the organic light-emitting display device 100 is powered on, the light-emitting pathway of the pixels 111 is substantially completely uncovered by moving the ink particles 120a to the main electrode 123, and thus brightness is not reduced. While the organic light-emitting display device is powered off, the pixels 111 are substantially covered by the ink particles 120a to provide black visibility, and thus the organic light-emitting display device may have an attractive screen.

As a result of performing simulations, while a typical polarization plate has a reflectivity of about 4.3% and a transmittance of about 44%, the electronic ink layer 120 according to the current embodiment has excellent optical characteristics with a reflectivity of about 0.3% and a transmittance of about 62.3%. This result indicates that the transmittance of light is considerably increased using the electronic ink layer 120 compared to using the polarization plate, and thus a reduction of brightness caused by the black visibility may be inhibited.

In other words, the electronic ink layer 120 operating in the same manner as a shutter may efficiently provide the black visibility and inhibit the reduction of the brightness.

Figure 3:
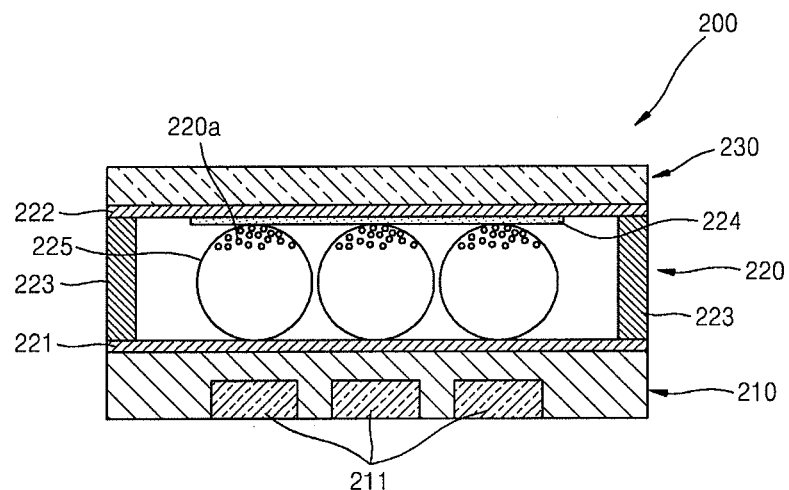
FIG. 3 shows an organic light-emitting display device which is powered off according to another embodiment.
Figure 4:
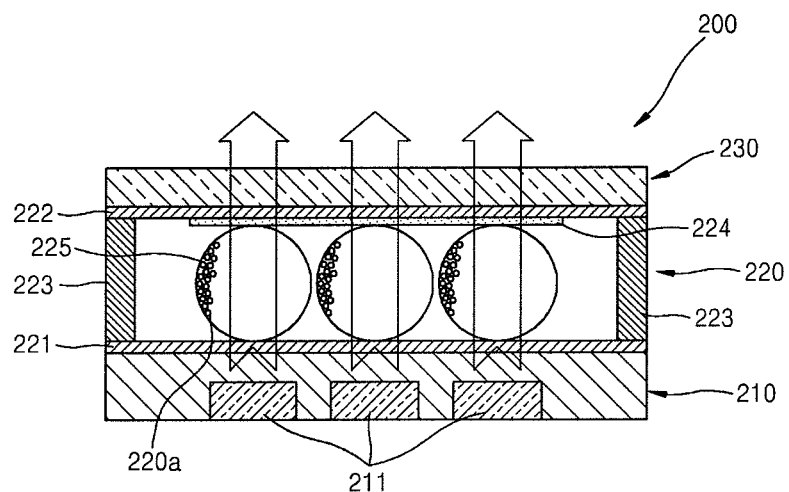

FIGS. 3 and 4 show an organic light-emitting display device 200 according to another embodiment in powered-off and powered-on states, respectively.

The organic light-emitting display device 200 includes a display unit 210 including a plurality of pixels 211, a transparent window 230 disposed on the display unit 210, and an ink layer 220 interposed between the display unit 210 and the transparent window 230. Reference numerals 221 and 222 indicate protective films substantially covering upper and lower surfaces of the electronic ink layer 220.

The electronic ink layer 220 includes a plurality of charged ink particles 220a contained in a capsule 225, a main electrode 223 that electrically attracts the ink particles 220a in a horizontal direction of FIGS. 3 and 4 (hereinafter, referred to as first direction), and an auxiliary electrode 224 that electrically attracts the ink particles 220a in a substantially vertical direction of FIGS. 3 and 4 (hereinafter, referred to as second direction). A mechanism of the electronic ink layer 220 will be described in detail later.

In addition, each of the pixels 211 of the display unit 210 is a unit pixel including a self-emitting organic light-emitting device (not shown) for forming an image. An image is formed when light generated in an emission layer of each organic light-emitting device is emitted via the transparent window 230.

Accordingly, when an image is formed, light generated in each pixel 211 passes through the electronic ink layer 220 and the transparent window 230. In this regard, upper portions of the pixels 211 toward the transparent window 230 may be selectively substantially covered or uncovered according to a distribution of the ink particles 220a of the electronic ink layer 220.

In one embodiment, while the display unit 210 is powered on, i.e., while an image is formed, the ink particles 220a of the electronic ink layer 220 does not cover the upper portions of the pixels 211. In one embodiment, while the display unit 210 is powered off, i.e., while an image is not formed, the ink particles 220a substantially covers the upper portions of the pixels 211 to provide black visibility to a screen.

An operation of the electronic ink layer 220 will be described.

First, the ink particles 220a are black particles capable of providing black visibility. The ink particles 220a are positively or negatively charged particles. Thus, the ink particles 220a may move by an electrical force.

According to the current embodiment, since the ink particles 220a are contained in the capsule 225, they may move within the capsule 225 by the electrical force. Thus, the size of one capsule 225 is greater than the size of one pixel 211 disposed under the capsule 225 and corresponding to the capsule 225. Accordingly, there may be a space in which the ink particles 220a do not substantially cover the pixels 211. The space may correspond to a gap between the pixels 211.

In addition, the main electrode 223 is connected to a power source of the display unit 210 and powered on/off with the display unit 210. In other words, a voltage is applied to the main electrode 223 when the display unit 210 is powered on, and the voltage is not applied to the main electrode 123 when the display unit 210 is powered off.

A voltage is not applied to the auxiliary electrode 224, normally, and a momentary voltage is applied to the auxiliary electrode 224 for about 0.1 ms only when the display unit 210 is powered off.

In such a structure, since a voltage is not applied to the main electrode 223 while the organic light-emitting display device 200 is powered off as shown in FIG. 3, an electric force is not applied to the charged ink particles 220a of the electronic ink layer 220.

Thus, the ink particles 220a move in the second direction to be distributed near the auxiliary electrode 224 within the capsule 225 of the electronic ink layer 220, so that black ink particles 220a substantially cover the pixels 211. That is, when the display unit 210 is powered off, a momentary voltage is applied to the auxiliary electrode 224 as described above, so that the ink particles 220a gather around the auxiliary electrode 224.

Although the ink particles 220a are substantially uniformly distributed within the capsule 225 over time after the organic light-emitting display device 200 is powered off, the ink particles 220a still substantially cover the pixels 211. The ink particles 220a, which gather while the organic light-emitting display device 200 is powered on, substantially immediately move to positions substantially covering the pixels 211 by applying the momentary voltage to the auxiliary electrode 224 when the organic light-emitting display device 200 is powered off.

Thus, the pixels 211 are not visible by the ink particles 220a, and black visibility is provided to the screen. In other words, the electronic ink layer 220 functions as a polarization plate to provide black visibility to the screen while the organic light-emitting display device 200 is powered off.

Then, when the organic light-emitting display device 200 is powered on, a voltage is applied to the main electrode 223 as shown in FIG. 4, so that the charged ink particles 220a of the electronic ink layer 220 is electrically attracted the main electrode 123 and thus moved in the first direction toward the main electrode 123 within the capsule 225.

Here, the ink particles 220a are either positively or negatively charged. Accordingly, the ink particles 220a gather around one of electrodes of the main electrode 123.

Although the ink particles 220a may either be positively or negatively charged, the ink particles 220a are either positively or negatively charged according to the current embodiment so that the ink particles 220a are positioned in gaps between the pixels 211. If the ink particles 220a gather around opposite sides of the capsule 225, a space occupied by the ink particles 220a may increase. Thus, the ink particles 220a may either be positively or negatively charged according to the current embodiment to increase efficiency.

As such, if the ink particles 220a gather around the main electrode 223 within the capsule 225, the upper portions of the pixels 211 of the display unit 210 are uncovered. In other words, after the ink particles 220a move toward the main electrode 223, gaps are formed between the pixels 211, and thus a light-emitting pathway of the pixels 211 for forming an image is open. Here, if the organic light-emitting device (not shown) of each pixel 211 emits light, the light passes through the electronic ink layer 220 and the transparent window 230 to form an image.

Accordingly, while the display unit 210 is powered on, the light-emitting pathway of the pixels 211 is substantially completely uncovered by moving the ink particles 220a to positions corresponding to the gaps between the pixels 211, and thus brightness is not reduced. While the display unit 210 is powered off, the pixels 211 are substantially covered by the ink particles 220a to provide black visibility, and thus the organic light-emitting display device may have an attractive screen. In other words, the electronic ink layer 220 operating in the same manner as a shutter may efficiently provide the black visibility and inhibit the reduction of the brightness.

As described above, the organic light-emitting display device according to at least one of the disclosed embodiments provides black visibility while the display device is powered off using an electronic ink layer operating in the same manner as a shutter so that a reduction of brightness while forming an image may be inhibited.

While certain embodiments have been shown and described with reference to the accompanying drawings, it will be understood by those of ordinary skill in the art that various changes in form and details may be made therein without departing from the spirit and scope of the following claims.

What is claimed is:

1. An organic light-emitting display device comprising:
a display unit comprising a plurality of pixels; and
an electronic ink layer configured to change a distribution of charged ink particles, the charged ink particles selectively substantially covering the pixels of the display unit while the display unit is powered off and the charged ink particles selectively substantially not covering the pixels of the display unit while the display unit is powered on.

2. The organic light-emitting display device of claim 1, wherein the electronic ink layer comprises a main electrode to apply an electrical force to the charged ink particles, and
wherein the charged ink particles are configured to collect around the main electrode, based on a voltage applied to the main electrode, while the display unit is powered on.

3. The organic light-emitting display device of claim 1, wherein the charged ink particles are distributed in gaps between the pixels when moving in the first direction.

4. The organic light-emitting display device of claim 1, wherein the electronic ink layer comprises a plurality of capsules, and wherein the charged ink particles are disposed in the capsules, and wherein the size of one capsule is greater than a size of one pixel.

5. The organic light-emitting display device of claim 1, wherein a transparent window is disposed on the display unit, and wherein the electronic ink layer is disposed between the display unit and the transparent window.

6. The organic light-emitting display device of claim 5, further comprising a protective film interposed between the display unit and the electronic ink layer and between the electronic ink layer and the transparent window.

7. The organic light-emitting display device of claim 1, wherein the electronic ink layer comprises a main electrode and an auxiliary electrode to apply an electrical force to the charged ink particles in different directions, wherein the charged ink particles are configured to collect around the main electrode, based on a voltage applied to the main electrode, when the display unit is powered on, and wherein the charged ink particles are configured to collect around the auxiliary electrode, based on a momentary voltage applied to the auxiliary electrode, when the display unit is powered off.

8. The organic light-emitting display device of claim 7, wherein the electronic ink layer comprises a plurality of capsules, and wherein the charged ink particles are disposed in the capsules.

9. The organic light-emitting display device of claim 8, wherein the charged ink particles are configured to move in a first direction toward the main electrode within the capsules when the display unit is powered on to uncover the pixels and move in a second direction, substantially perpendicular to the first direction, toward the auxiliary electrode within the capsules when the display unit is powered off to substantially cover the pixels.

10. An organic light-emitting display device comprising:
a display unit comprising a plurality of pixels; and
an electronic ink layer configured to change a distribution of charged ink particles and selectively substantially cover the pixels of the display unit,
wherein the charged ink particles of the electronic ink layer are distributed to substantially cover the pixels while the display unit is powered off and not to cover the pixels while the display unit is powered on,
wherein the electronic ink layer comprises a main electrode and an auxiliary electrode to apply an electrical force to the charged ink particles in different directions,
wherein the charged ink particles are configured to collect around the main electrode, based on a voltage applied to the main electrode, when the display unit is powered on,
wherein the charged ink particles are configured to collect around the auxiliary electrode, based on a momentary voltage applied to the auxiliary electrode, when the display unit is powered off,
wherein the electronic ink layer comprises a plurality of capsules, and wherein the charged ink particles are disposed in the capsules,
wherein the charged ink particles are configured to move in a first direction toward the main electrode within the capsules when the display unit is powered on to uncover the pixels and move in a second direction, substantially perpendicular to the first direction, toward the auxiliary electrode within the capsules when the display unit is powered off to substantially cover the pixels, and
wherein the charged ink particles are distributed in gaps between the pixels when moving in the first direction.

11. An organic light-emitting display device comprising:
a display unit comprising a plurality of pixels; and
an electronic ink layer configured to change a distribution of charged ink particles and selectively substantially cover the pixels of the display unit,
wherein the charged ink particles of the electronic ink layer are distributed to substantially cover the pixels while the display unit is powered off and not to cover the pixels while the display unit is powered on,
wherein the electronic ink layer comprises a main electrode and an auxiliary electrode to apply an electrical force to the charged ink particles in different directions,
wherein the charged ink particles are configured to collect around the main electrode, based on a voltage applied to the main electrode, when the display unit is powered on,
wherein the charged ink particles are configured to collect around the auxiliary electrode based on a momentary voltage applied to the auxiliary electrode, when the display unit is powered off,
wherein the electronic ink layer comprises a plurality of capsules, and wherein the charged ink particles are disposed in the capsules, and
wherein the size of one capsule is greater than a size of one pixel.

* * * * *

UNITED STATES PATENT AND TRADEMARK OFFICE
CERTIFICATE OF CORRECTION

PATENT NO.        : 8,576,477 B2                            Page 1 of 1
APPLICATION NO.   : 13/296902
DATED             : November 5, 2013
INVENTOR(S)       : Hye-Jung Park et al.

It is certified that error appears in the above-identified patent and that said Letters Patent is hereby corrected as shown below:

On the Title Page

In column 1 (page 1, item 30), under "Foreign Application Priority Data," please change "(KH)" to --(KR)--

Signed and Sealed this
Third Day of June, 2014

Michelle K. Lee
*Deputy Director of the United States Patent and Trademark Office*